(12) United States Patent
Nakashima et al.

(10) Patent No.: US 7,451,843 B2
(45) Date of Patent: Nov. 18, 2008

(54) CONSTRUCTION MACHINE

(75) Inventors: Hajime Nakashima, Hiroshima (JP);
Kazuhiro Ueda, Hiroshima (JP);
Yasumasa Kimura, Kobe (JP); Hideo Utsuno, Kobe (JP); Toshiyuki Kobayashi, Kobe (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 195 days.

(21) Appl. No.: 10/559,709

(22) PCT Filed: Jun. 15, 2004

(86) PCT No.: PCT/JP2004/008680

§ 371 (c)(1),
(2), (4) Date: Dec. 7, 2005

(87) PCT Pub. No.: WO2004/111405

PCT Pub. Date: Dec. 23, 2004

(65) Prior Publication Data

US 2006/0144350 A1    Jul. 6, 2006

(30) Foreign Application Priority Data

Jun. 16, 2003 (JP) ............................ 2003-170532

(51) Int. Cl.
*B60K 11/04* (2006.01)
(52) U.S. Cl. .................................. 180/68.1; 180/68.4
(58) Field of Classification Search ............... 180/68.1, 180/68.2, 68.3, 68.4, 68.6
See application file for complete search history.

(56) References Cited

U.S. PATENT DOCUMENTS

| | | | | |
|---|---|---|---|---|
| 3,788,418 A | * | 1/1974 | Clancy et al. | 180/68.4 |
| 5,551,505 A | * | 9/1996 | Freeland | 165/41 |
| 5,791,301 A | * | 8/1998 | Watanabe | 123/41.31 |
| 5,816,351 A | * | 10/1998 | Akira et al. | 180/68.1 |
| 6,032,620 A | * | 3/2000 | Tsukiana et al. | 123/41.48 |
| 6,192,839 B1 | * | 2/2001 | Takeshita et al. | 123/41.49 |
| 6,223,845 B1 | * | 5/2001 | Miyachi et al. | 180/68.3 |
| 6,302,066 B1 | * | 10/2001 | Steinmann | 123/41.49 |

(Continued)

FOREIGN PATENT DOCUMENTS

JP     87302/1975     7/1975

(Continued)

*Primary Examiner*—Jeffrey J Restifo
(74) *Attorney, Agent, or Firm*—Oblon, Spivak, McClelland, Maier & Neustadt, P.C.

(57) ABSTRACT

Engine noise of a construction machine is effectively reduced without reducing cooling performance and with an increase in the height of a body cover kept minimum. To achieve the above, an air-intake opening portion (10) and an air discharge opening portion (11) are arranged in a body cover (8) of an upper rotating body (1), and a cooling fan (5) in an engine room covered by the body cover (8) is driven, taking cooling air in from the air-intake opening portion (10) to cool a heat exchanger (7) in the body cover (8) and discharging the air from the air discharge opening portion (11). The air-intake opening portion (10) is laterally offset from a position facing to a ventilation surface of the heat exchanger (7). Alternatively, plural air-intake opening portions are located in a scattered manner such that the plural air-intake opening portions include the offset air-intake opening portion offset from the ventilation surface of the heat exchanger (7).

18 Claims, 11 Drawing Sheets

U.S. PATENT DOCUMENTS

| | | | |
|---|---|---|---|
| 6,390,770 B1 * | 5/2002 | Takeshita | 415/119 |
| 6,405,825 B1 * | 6/2002 | Yabe et al. | 181/204 |
| 6,427,798 B1 * | 8/2002 | Imashige | 180/309 |
| 6,431,299 B1 * | 8/2002 | Asche et al. | 180/68.1 |
| 6,540,036 B1 * | 4/2003 | Sugano | 180/68.1 |
| 6,601,324 B2 * | 8/2003 | Iwasa et al. | 37/347 |
| 6,622,668 B2 * | 9/2003 | Izumi | 123/41.49 |
| 6,655,486 B2 * | 12/2003 | Oshikawa et al. | 180/68.1 |
| 6,688,424 B1 * | 2/2004 | Nakada et al. | 181/224 |
| 6,745,860 B2 * | 6/2004 | Yabe | 180/68.1 |
| 6,901,903 B2 * | 6/2005 | Nakajima et al. | 123/198 E |
| 6,922,925 B2 * | 8/2005 | Watanabe et al. | 37/466 |
| 7,131,422 B2 * | 11/2006 | Kimura et al. | 123/198 E |
| 7,134,518 B2 * | 11/2006 | Arai et al. | 180/68.1 |
| 7,143,852 B2 * | 12/2006 | Yatsuda et al. | 180/69.2 |
| 7,182,164 B2 * | 2/2007 | Merlo | 180/68.1 |

FOREIGN PATENT DOCUMENTS

| | | |
|---|---|---|
| JP | 1626/1992 | 1/1992 |
| JP | 6-144022 | 5/1994 |
| JP | 53250/1994 | 7/1994 |
| JP | 8-218869 | 8/1996 |
| JP | 8-277713 | 10/1996 |
| JP | 9-195771 | 7/1997 |
| JP | 11-82055 | 3/1999 |

* cited by examiner

BASIC MODEL (100% MODEL)

L'/L=125, 75, 50, 25% MODEL

0% MODEL

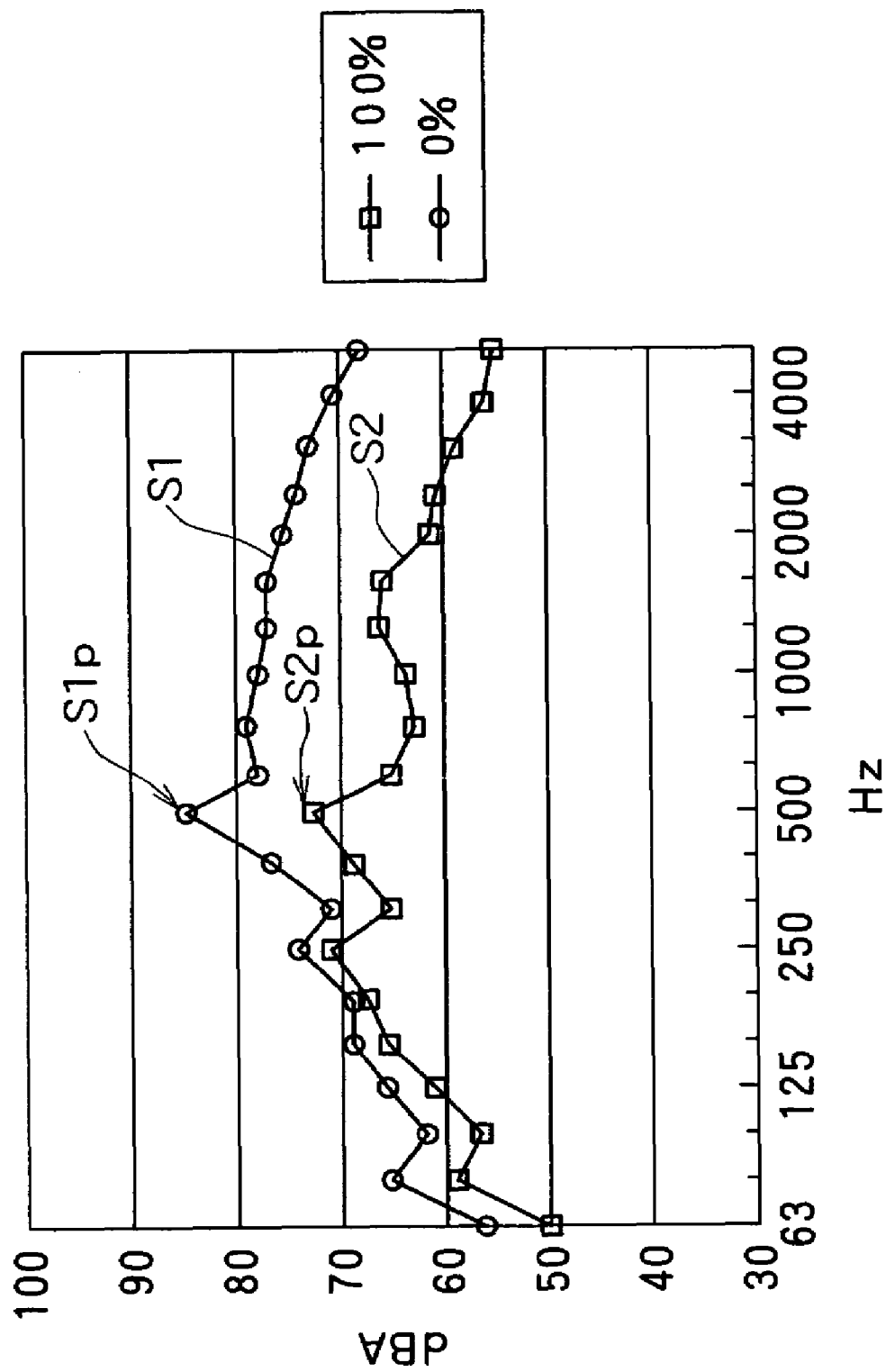

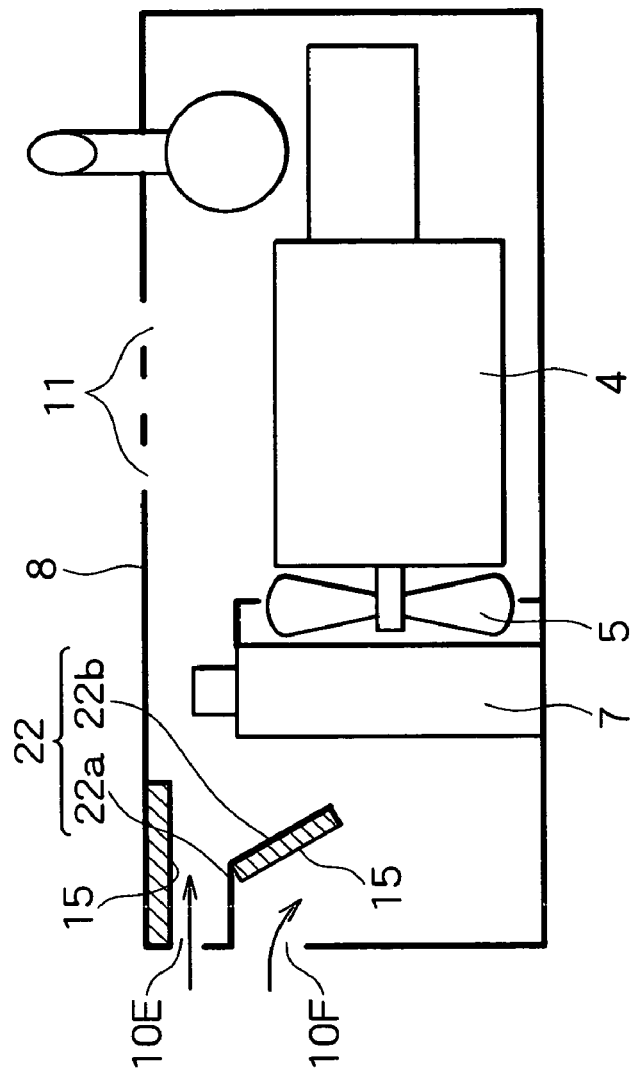
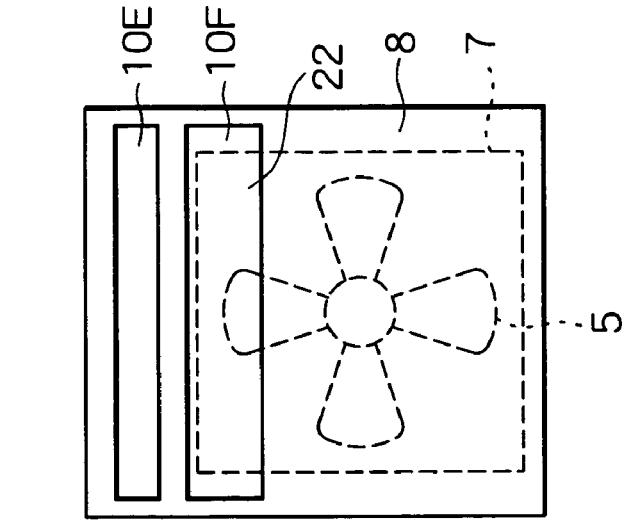

CONSTRUCTION MACHINE

TECHNICAL FIELD

The present invention relates to a construction machine such as a hydraulic excavator or a crane and more particularly to a construction machine of a low noise type with reduced engine noise.

BACKGROUND ART

In a hydraulic excavator as a construction machine according to the prior art, a hydraulic pump for the supply of pressure oil to a hydraulic drive system such as a working attachment is driven by an engine, and a radiator is used for cooling the engine. The radiator is cooled by a cooling fan disposed downstream of and in proximity to the radiator. Heat radiating devices, including the hydraulic pump, other than the engine are air-cooled by contact therewith of cooling air which has been used to cool the radiator. As to the working fluid, it is cooled by an oil cooler disposed in series with the radiator.

Cooling air for cooling heat exchangers such as the radiator and the oil cooler both referred to above is usually introduced through an intake opening portion formed in a side face of an engine guard and exhaust air after heat exchange is discharged to the exterior through an exhaust opening portion formed in an upper surface of the engine guard.

In such a cooling structure, the intake opening portion is usually disposed in opposition to the heat exchanger, so that engine noise including noise of the cooling fan leaks directly from the intake opening portion to the exterior, causing noise in the exterior.

With a view to diminishing the leakage of engine noise to the exterior there has been proposed a soundproof device wherein a splitter sound deadening device is disposed in close contact with a radiator opening portion [see, for example, pages (3) and (4), FIGS. 4 and 6, of Japanese Patent Laid-Open Publication No. Hei 6-144022 (Patent Document 1)].

In the splitter sound deadening device, a duct-shaped box member is attached to a passage of exhaust air which is discharged from a radiator by an extrusion cooling fan and then discharged from an exhaust opening portion of an engine guard, the interior of the box member is partitioned to a plurality of exhaust air chambers, and a sound absorbing material is affixed to the inner wall of each exhaust air chamber to reduce noise.

On the other hand, as an arrangement wherein an intake opening portion and a radiator are not opposed to each other, there has been proposed an arrangement wherein a duct connected between an intake opening portion and a radiator is bent in to an L shape and the intake opening portion is disposed toward the center of the machine body [see, for example, page (2), FIG. 1, of Japanese Patent Laid-Open Publication No. Hei 8-218869 (Patent Document 2)].

DISCLOSURE OF THE INVENTION

Although in Patent Document 1 is disclosed a sound deadening measure for an exhaust air port of the radiator, no disclosure is found therein about reducing engine noise leaking to the exterior from the intake opening portion which is for introducing air into the machine body. Moreover, according to the structure described in Patent Document 1, in order to reduce engine noise, the radiator overlies the engine by one stage and the exhaust air port is shifted downward relative to the extrusion cooling fan of the radiator. In such an arrangement, however, since the radiator and the exhaust air port are shifted from each other, the radiator must be positioned higher than the usual position thereof, with an inconvenient result that an upper surface of a body cover must be set high accordingly. Such a remarkable increase in height of the upper surface of the body cover can be an obstacle to a backward visual field from the operator's seat and therefore it is desired to suppress such an increase.

On the other hand, in the soundproofing structure described in Patent Document 2, a fan is disposed sideways and an intake opening portion is formed in an upper surface of a body cover and a duct for connection between the fan and the intake opening portion is largely bent at an angle of 90° or more within a narrow region. Consequently, not only the air flow resistance increases, but also noise is muffled in the central portion of the machine body and reflects upward, thus giving rise to the problem that a louder noise is generated upward or the muffled noise is propagated to a cabin to increase the internal noise of the cabin without reducing the cooling performance.

The present invention has been accomplished in view of the above-mentioned problems encountered in the conventional soundproofing structures and provides a construction machine able to reduce engine noise effectively without causing deterioration of cooling performance and while suppressing an increase in height of a body cover.

More specifically, according to the present invention there is provided a construction machine comprising a lower traveling body, an upper rotating body mounted rotatably on the lower traveling body, and an engine room disposed in the upper rotating body and covered with a body cover, with cooling air being introduced from an air-intake opening portion formed in the body cover by operation of a cooling fan disposed within the engine room to cool a heat exchanger accommodated within the body cover and exhaust air after heat exchange being discharged from an exhaust opening portion formed in the body cover, wherein the air-intake opening portion includes an offset opening portion, the offset opening portion being offset disposed or shifted in a lateral direction relative to a vent surface of the heat exchanger so as to protrude at least partially from the vent surface of the heat exchanger when the inside of the body cover is seen through the air-intake opening portion in a direction orthogonal to the surface of the body cover with the air-intake opening portion formed therein.

According to this configuration, upon operation of the cooling fan, the cooling air is introduced into the machine body from the air-intake opening portion which is disposed obliquely laterally relative to the heat exchanger and is heat-exchanged while passing through the heat exchanger, then the cooling air after the heat exchange is discharged to the exterior of the machine through the exhaust opening portion. In this case, the air-intake opening portion is formed as an offset opening portion which is offset disposed in a lateral direction relative to the vent surface of the heat exchanger so that at least a part of the air-intake opening portion protrudes from the vent surface when the inside of the body cover is seen through the air-intake opening portion in a direction orthogonal to the surface of the body cover with the air-intake opening portion formed therein. Therefore, a part or the whole of the front face of the heat exchanger is shielded by the body cover connected to the air-intake opening portion, whereby the direct leakage of engine noise to the exterior is suppressed and engine noise is so much reduced. Besides, since the offset direction of the offset opening portion is a lateral direction, the aforesaid reduction of engine noise can be attained while preventing an increase in height of the body cover.

To be more specific, the engine and the heat exchanger may be disposed in the transverse direction of the construction machine in the rear portion of the upper rotating body and the air-intake opening portion may be offset disposed on the front side of the upper rotating body relative to the vent surface of the heat exchanger. According to this arrangement, a large offset quantity can be ensured on the front side of the upper rotating body without a special increase in size of the body cover.

There may be adopted a configuration wherein the heat exchanger is disposed in proximity to the body cover which covers a rear end portion of the upper rotating body and a guide surface for guiding cooling air introduced from the air-intake opening portion to the heat exchanger is constituted by the body cover, or a configuration wherein a cabin is provided in the upper rotating body at a position ahead of the engine and the heat exchanger, the air-intake opening portion is formed at a position between the cabin and the vent surface of the heat exchanger, an engine guard is provided between the air-intake opening portion and the cabin, and a guide surface for guiding cooling air introduced from the air-intake opening portion to the heat exchanger is constituted by the engine guard. According to these configurations, the intake of air can be done smoothly by a simple structure even while allowing the vent surface of the heat exchanger and the air-intake opening portion to be offset from each other.

According to the present invention there also is provided a construction machine comprising a lower traveling body, an upper rotating body mounted rotatably on the lower traveling body, and an engine room disposed in the upper rotating body and covered with a body cover, with cooling air being introduced from an air-intake opening portion formed in the body cover by operation of a cooling fan disposed within the engine room to cool a heat exchanger accommodated within the body cover and exhaust air after heat exchange being discharged from an exhaust opening portion formed in the body cover, wherein the air-intake opening portions are provided dispersedly in plural positions and include an offset opening portion, the offset opening portion being offset disposed relative to a vent surface of the heat exchanger so as to protrude at least partially from the vent surface of the heat exchanger when the inside of the body cover is seen through the offset opening portion in a direction orthogonal to the surface of the body cover with the offset opening portion formed therein.

In this configuration, a part or the whole of the front face of the heat exchanger is shielded by the body cover connected to the air-intake opening portions, whereby the direct leakage of engine noise to the exterior is suppressed and engine noise is so much reduced. Besides, since air-intake opening portions are disposed in a dispersed manner, an offset quantity (a size protruding to the outside from the vent surface) of the offset opening portion included in the air-intake opening portions can be kept small as compared with the provision of a single air-intake opening portion. As a result, it is possible to reduce the engine noise while ensuring large the total opening area of the air-intake opening portions and keeping small the height of the body cover.

There may be adopted a configuration wherein the air-intake opening portions are the offset opening portions which are offset disposed in mutually different directions relative to the vent surface of the heat exchanger. According to this configuration, the offset quantity of the offset opening portions can be dispersed without being offset to a specific direction, whereby an increase in size of the body cover can be prevented.

To be more specific, the offset opening portions may include an offset opening portion which is offset disposed vertically relative to the vent surface of the heat exchanger and an offset opening portion which is offset disposed laterally relative to the said vent surface. According to this configuration, the respective offset opening portions can be disposed in a well-balanced manner without being offset to one direction.

All the air-intake opening portions may be the offset opening portions, whereby engine noise can be reduced more effectively.

In the present invention, in case of air-intake opening portions being formed, the air-intake opening portions may include a non-offset opening portion other than the offset opening portion or a partial offset opening portion wherein a part of the opening region is offset disposed to such an extent as overlaps with the vent surface of the heat exchanger. In this case, there may be adopted a configuration wherein on the inner side of at least a part of the air-intake opening portions out of the non-offset opening portion and the partial offset opening portion there is interposed a shield material for shielding between the air-intake opening portion concerned and the vent surface of the heat exchanger. According to this configuration it is possible to obtain the engine noise reducing effect also with respect to such non-offset opening portion or partial offset opening portion. Consequently, it is possible to attain an effective reduction of engine noise while keeping small the offset quantity of the air-intake opening portion from the vent surface to diminish the occupied area of all the air-intake opening portions.

In case of using the shield material, if a sound absorbing material is provided on at least one side face of the shield material, the engine noise reducing effect is further enhanced.

In the present invention, the larger the offset quantity (shifted quantity) of the air-intake opening portion, the more outstanding the sound deadening effect. An upper-limit value of the offset quantity may be determined on the basis of the internal layout or space of the upper rotating body, but as the offset disposed opening portion it is preferable to include one which is offset relative to the vent surface of the heat exchanger to the extent that, when the vent surface is seen through the offset opening portion in a direction orthogonal to the vent surface, the ratio of the vent surface capable of being seen is 50% or less of the whole opening area of the offset opening portion.

All the air-intake opening portions may be offset disposed relative to the vent surface to the extent that, when the vent surface is seen through the offset opening portions in a direction orthogonal to the vent surface, the ratio of the vent surface capable of being seen is 50% or less of the whole opening area of the offset opening portions. According to this arrangement there is obtained a more outstanding engine noise reducing effect.

Preferably, there is provided guide means for guiding cooling air introduced from the air-intake opening portion to the heat exchanger.

As the guide means it is effective to use a duct which provides a connection between the vent surface and the air-intake opening portion.

A sound absorbing material may be affixed to the guide means and a splitter or cell type sound deadening device may be incorporated within the duct. Moreover, an air guide plate for guiding cooling air introduced from the air-intake opening portion to the heat exchanger side may be provided within the duct and a sound absorbing material may be affixed to the air guide plate. As a result, it is possible to obtain a more outstanding engine noise reducing effect.

BRIEF DESCRIPTION OF THE DRAWINGS

FIG. 5 is a graph showing the results of frequency analysis;

FIG. 12A is a front view showing an eighth embodiment of the present invention and FIG. 12B is a sectional side view thereof.

BEST MODE FOR CARRYING OUT THE INVENTION

Preferred embodiments of the present invention will be described hereinunder with reference to the drawings.

Figure 1:
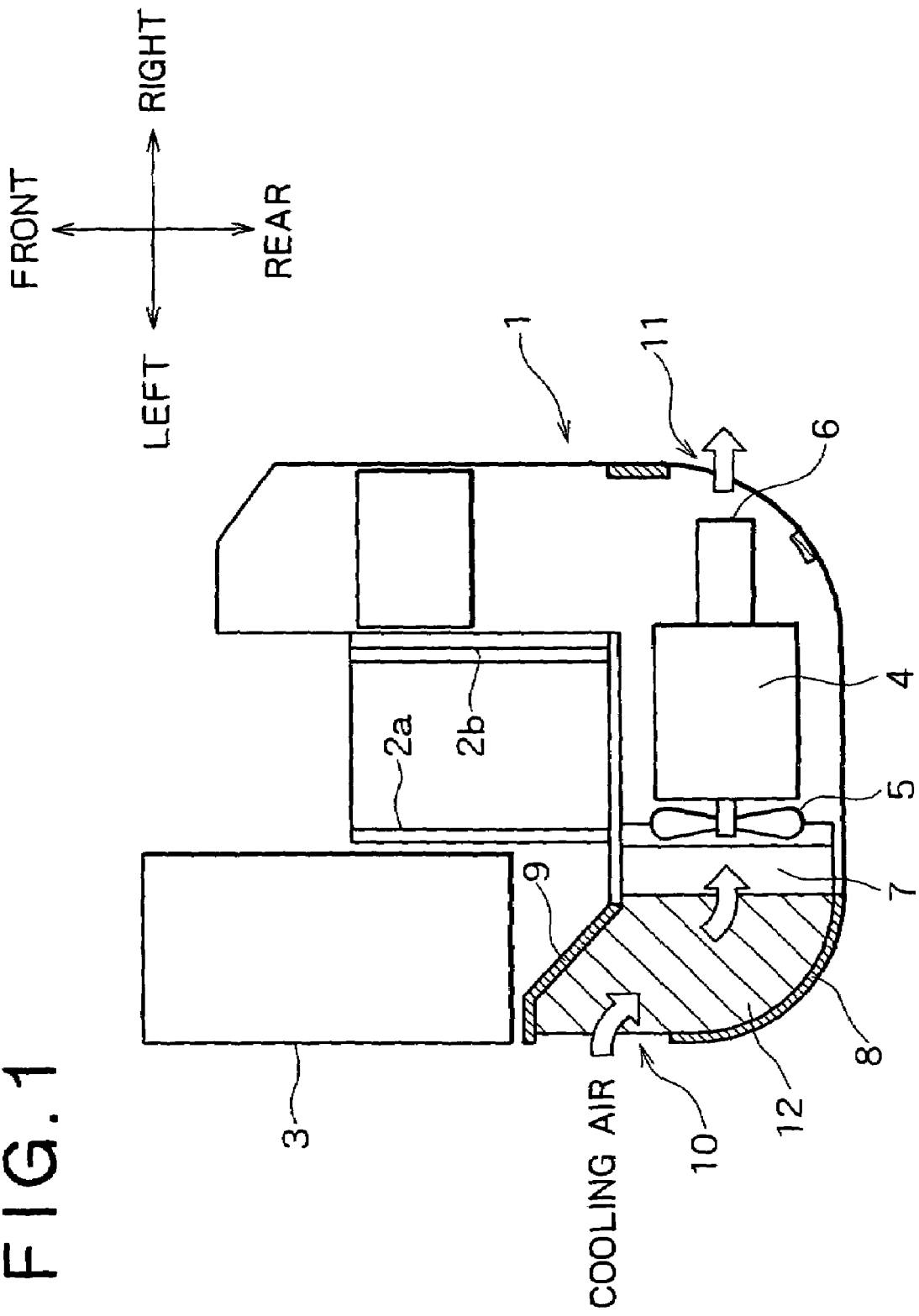
FIG. 1 is a plan view of an upper rotating body of a hydraulic excavator to which a soundproofing structure of a construction machine according to an embodiment of the present invention is applied.

FIG. 1 is a plan view of an upper rotating body 1 of a hydraulic excavator to which the present invention is applied.

In the same figure, main frames 2a and 2b extend longitudinally and nearly centrally of the upper rotating body 1 and a cabin 3 is disposed on the left side of the main frame 2a.

An engine guard 9 is disposed behind the cabin 3. Further, an engine 4 is disposed in the transverse direction of the hydraulic excavator in the rear portion of the upper rotating body 1 and at a backward position the engine guard 9. The engine 4 is accommodated within an engine room which is covered with a body cover 8. Within the engine room, a cooling fan 5 is disposed on the left side of the engine 4 and a hydraulic pump 6 is disposed on the right side of the engine. The cooling fan 5 is of the suction type and a radiator (heat exchanger) 7 is disposed upstream of the cooling fan 5.

An air-intake opening portion 10 for the intake of cooling air is formed in a cabin-side side wall of the body cover 8 and an exhaust opening portion (an air discharge opening portion) 11 for discharging the introduced cooling air to the exterior of the machine is formed at a position opposed to the hydraulic pump 6 in the body cover 8.

In this configuration, upon operation of the cooling fan 5, cooling air is introduced into the machine body through the air-intake opening portion 10 formed on the right side of the machine body (see, outline arrows in the figure), then flows rightward through the machine body and, while passing through the radiator 7, is heat-exchanged with engine cooling water flowing through a heat transfer pipe of the radiator. The cooling air thus heat-exchanged is discharged to the exterior of the machine through the exhaust opening portion 11.

Next, a low noise structure which is a characteristic portion of the present invention will be described below with reference to FIGS. 2 and 3.

Figure 2:
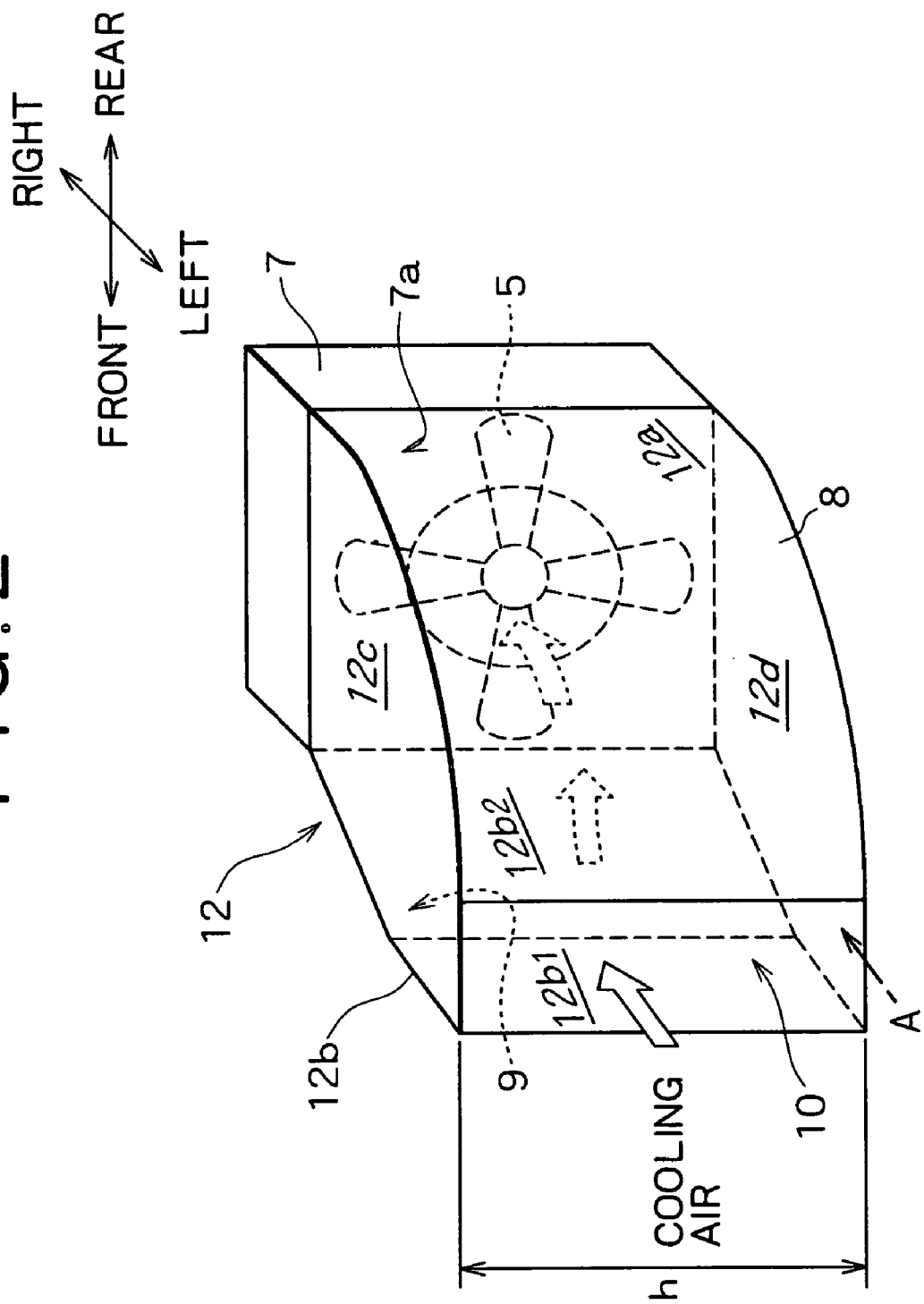
FIG. 2 is a perspective view showing an enlarged shape of a duct shown in FIG. 1.

FIG. 2 illustrates the low noise structure as seen from the air-intake opening portion 10 side.

In the following description, the same components as in FIG. 1 are identified by the same reference numerals as in FIG. 1 and explanations thereof will be omitted.

In FIG. 2, a duct (guide means) 12 is disposed between the air-intake opening portion 10 and the radiator 7. The duct 12 connects the air-intake opening portion 10 and the radiator 7 with each other in an oblique direction. More particularly, as will be described in detail later, the air-intake opening portion 10 is located at a position shifted, or offset, to the front side of the upper rotating body 1 relative to the radiator 7, and the shape of the duct 12 is set so as to connect the air-intake opening portion 10 and the radiator 7 with each other in a nearly horizontal direction.

The duct 12 is in a tubular shape surrounded by a rear wall 12a, a front wall 12b, an upper wall 12c, and a lower wall 12d. The rear wall 12a is constituted by a part of the body cover 8 which is in an arcuate shape and which covers a rear end portion of the upper rotating body 1. The front wall 12b is constituted by a part of the engine guard 9. The upper wall 12c and the lower wall 12d are constituted respectively by plates which connect the rear wall 12a and the front wall 12b with each other longitudinally. The height (h) of the duct 12 is set approximately equal to the height of the radiator 7.

That is, the portion of the body cover 8 which constitutes the rear wall 12a of the duct 12 and the portion of the engine guard 9 which constitutes the front wall 12b, serve as guide surfaces for guiding cooling air introduced from the air-intake opening portion 10 to the radiator 7.

In the case where a counterweight is disposed at the position of the body cover 8 shown in the figure, an inner wall of the counterweight can be utilized as the rear surface of the duct, i.e., one of the aforesaid guide surfaces.

The front wall 12b of the duct 12 comprises a vertical plate portion $12b_1$ disposed in the transverse direction and a vertical plate portion $12b_2$ bent obliquely from the right edge of the vertical plate portion $12b_1$ toward the radiator 7, i.e., to the rear side. By thus bending the front wall 12b in a chevron shape, a large amount of cooling air is introduced from the air-intake opening portion 10 and at the same time the cooling air thus introduced is admitted smoothly into the radiator 7.

If the air-intake opening portion 10 is formed in the upper surface of the body cover 8 as in the background art, the duct for connection between the intake side opening formed in that upper surface and the radiator protrudes at the left rear end of the upper rotating body 1. Meanwhile, as in this embodiment, when the air-intake opening portion 10 is positioned obliquely in front of the radiator 7 and the duct 12 is formed in a rhombic shape in plan, a part of the duct 12 can be constituted by the arcuate body cover 8. Thus, there accrues an advantage that the intake passage can be formed compact.

Figure 3:
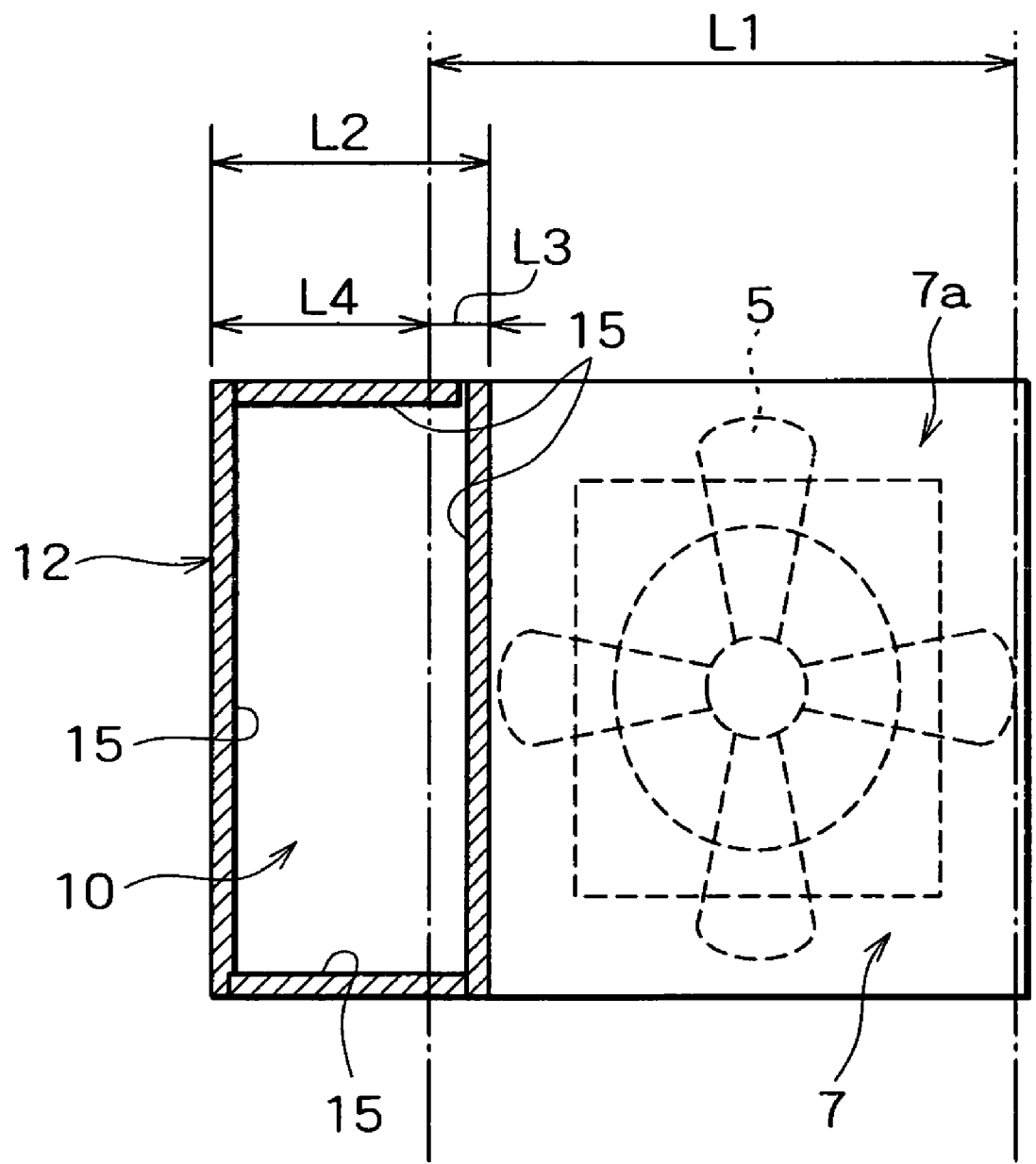
FIG. 3 is a front view seen from an arrow A in FIG. 2.

FIG. 3 illustrates the duct 12 as seen in a direction orthogonal to a vent surface 7a of the radiator 7 (in the direction of arrow A in FIG. 2), i.e., as seen sideways of the vehicle body.

In the same figure, L1 denotes a lateral width of the vent surface 7a of the radiator 7, L2 denotes a lateral width of the air-intake opening portion 10, L3 denotes an overlap width between the air-intake opening portion 10 and the radiator 7, and L4 denotes the difference (=L2−L3) between L2 and L3, i.e., a shift distance from the radiator 7 in the air-intake opening portion 10. In this case, the range which permits the radiator 7 to be seen directly through the air-intake opening portion 10 in the arrow A direction is only the range corresponding to the aforesaid overlap width L3.

Since the air-intake opening portion 10 is thus shifted (offset) with respect to the vent surface 7a of the radiator 7, engine noise repeats reflection within the duct 12 and there is scarcely any direct leakage of sound to the exterior. Further, a sound absorbing material 15 may be affixed to the inner wall of the duct 12 as shown in the figure, whereby the noise reflected within the duct 12 is absorbed by the sound absorbing material 15 and is greatly reduced.

Next, the following description is now provided about the results of analysis of the noise reducing effect attained by the low noise structure of this embodiment.

Figure 4A:
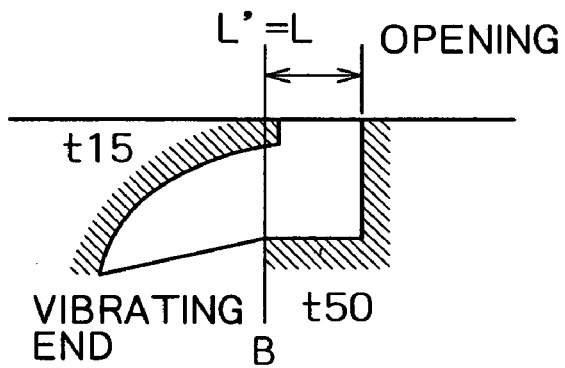
FIGS. 4A to 4C are model views for analyzing a soundproof effect attained by the present invention.
Figure 4B:
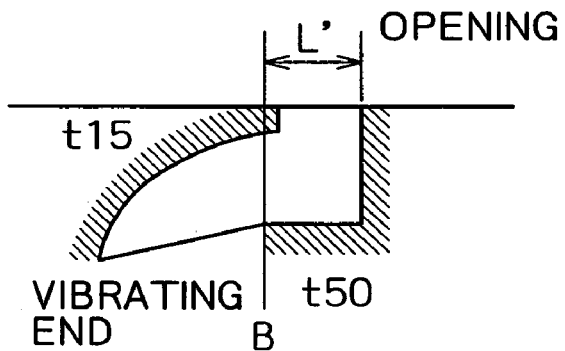
Figure 4C:
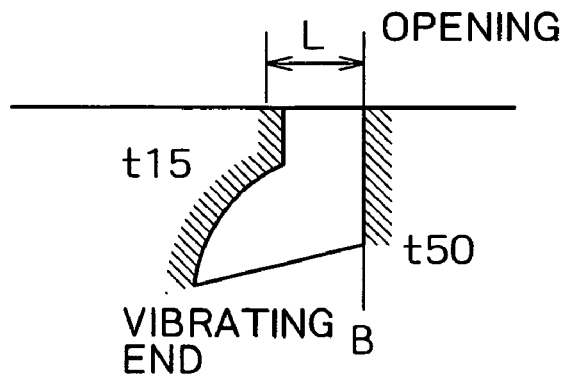

The analysis was made using models shown in FIGS. 4A to 4C and based on a two-dimensional analysis code in the boundary element method.

FIG. 4A shows a basic model in which an opening as the air-intake opening portion is completely deviated from the front position of the heat exchanger. An end portion of the air-intake opening portion is positioned away (offset) from the right end B of the heat exchanger as a vibrating end to be described later by a distance L' of 250 mm equal to an intake side opening width L of 250 mm. Thus, the heat exchanger and the opening are in a 100% offset state.

FIG. 4B shows a case where the offset quantity L'/L is changed in the range from 25% to 125%.

More specifically, in offsetting to the right side with the right end B of the heat exchanger as an axis, the offset quantity L'/L was changed to 125%, 75%, 50% and 25% and the resulting volume of sound reduction was measured.

In the models shown in FIGS. 4A and 4B, the area of the vent surface and that of the air-intake opening portion are set approximately equal to each other. For example, by L'/L=50%, it is meant that 50% of the area of the vent surface is shielded.

FIG. 4C shows a conventional model as a comparative model, in which the offset quantity is 0%.

Soft urethane foam sheets as sound absorbing materials having respectively a thickness (t) of 15 mm and a thickness (t) of 50 mm are affixed to the inner wall of the duct and sound absorbing boundary conditions are established on the basis of actually measured sound absorption characteristics of the sound absorbing materials. The sound absorbing materials are indicated respectively by hatched portions t15 and t50 in the figure. On the other hand, actual machine noise characteristics in the vicinity of the heat exchanger, i.e., equal vibrating frequency characteristics as a source of sound propagated through the radiator and vibrating the cooling fan, were used as a vibrating end.

Table 1 below shows the results of the analysis.

TABLE 1

| L'/L | S | Intensity (dB) | Amount of sound reduction (dB) |
|------|------|----------------|-------------------------------|
| 0%   | 100% | 147.2          |                               |
| 25%  | 75%  | 146.2          | 1.1                           |
| 50%  | 50%  | 144.1          | 3.2                           |
| 75%  | 25%  | 140.2          | 7.0                           |
| 100% | 0%   | 138.9          | 8.3                           |
| 125% | 0%   | 137.5          | 9.7                           |

In Table 1, S represents in what ratio the vent surface of the heat exchanger is seen when the same surface is seen through the air-intake opening portion in a direction orthogonal to the vent surface.

Overall values of acoustic intensity and a volume of sound reduction in the air-intake opening portion were obtained while changing the amount of offset. The results are shown in Table 1. From the same table it is seen that a sound volume reduction of 3 dB, which can be regarded as a significant difference, is obtained at an offset quantity L'/L of 50% (S=50%) and that a sound volume reduction as large as 8.3 dB is obtained at an offset quantity of 100% (S=0%), i.e., at the basic model.

From the above results of analysis it is seen that a satisfactory sound deadening effect can be obtained if the amount of offset between the heat exchanger and the air-intake opening portion is set to at least 50% or more and that an extremely high sound deadening effect can be obtained if the amount of offset is set at 100% or more (that is, if an arrangement is made in such a manner that the vent surface cannot be seen through the air-intake opening portion).

Next, the low noise structure of the present invention was applied to a hydraulic excavator of 12-ton class and the level of noise was measured at a 1-meter position in front of the air-intake opening portion.

In a conventional configuration wherein an intake side opening is formed in opposition to a radiator, the noise level was 88 dBA, while when the basic model of the low noise structure according to the present invention was applied, a measured result of noise level was 79 dBA and thus the engine noise could be reduced by 9 dB in comparison with the conventional configuration.

FIG. 5 is a graph showing the results of frequency analysis in the above measurement.

In the graph of FIG. 5, frequency (Hz) is plotted along the axis of abscissa and noise level (dBA) is plotted along the axis of ordinate. A characteristic S1 represents a conventional noise level, while a characteristic S2 represents a noise level of an actual machine to which the low noise structure of the present invention was applied.

As shown in the same graph, in the low noise structure of the present invention, the noise level is reduced as a whole in the frequency band of 63 to 4000 Hz, and in point of overall value the conventional noise level is reduced from 88 dBA to 79 dBA. Particularly, when noise level peaks (500 Hz) are compared with each other, it is seen that a peak value S1p in the conventional characteristic S1 is 85 dBA, while a peak value S2p in the characteristic S2 according to the structure of the present invention is reduced to 73 dBA.

The measurement of air flow rate was also performed under the same conditions. As a result, the air flow rate at an offset quantity of 0% was 111.3 m$^3$/min, while the air flow rate obtained using the basic model referred to above was 109 m$^3$/min, which is almost equal to the former value. That is, an air flow rate necessary for cooling is ensured.

Figure 6:
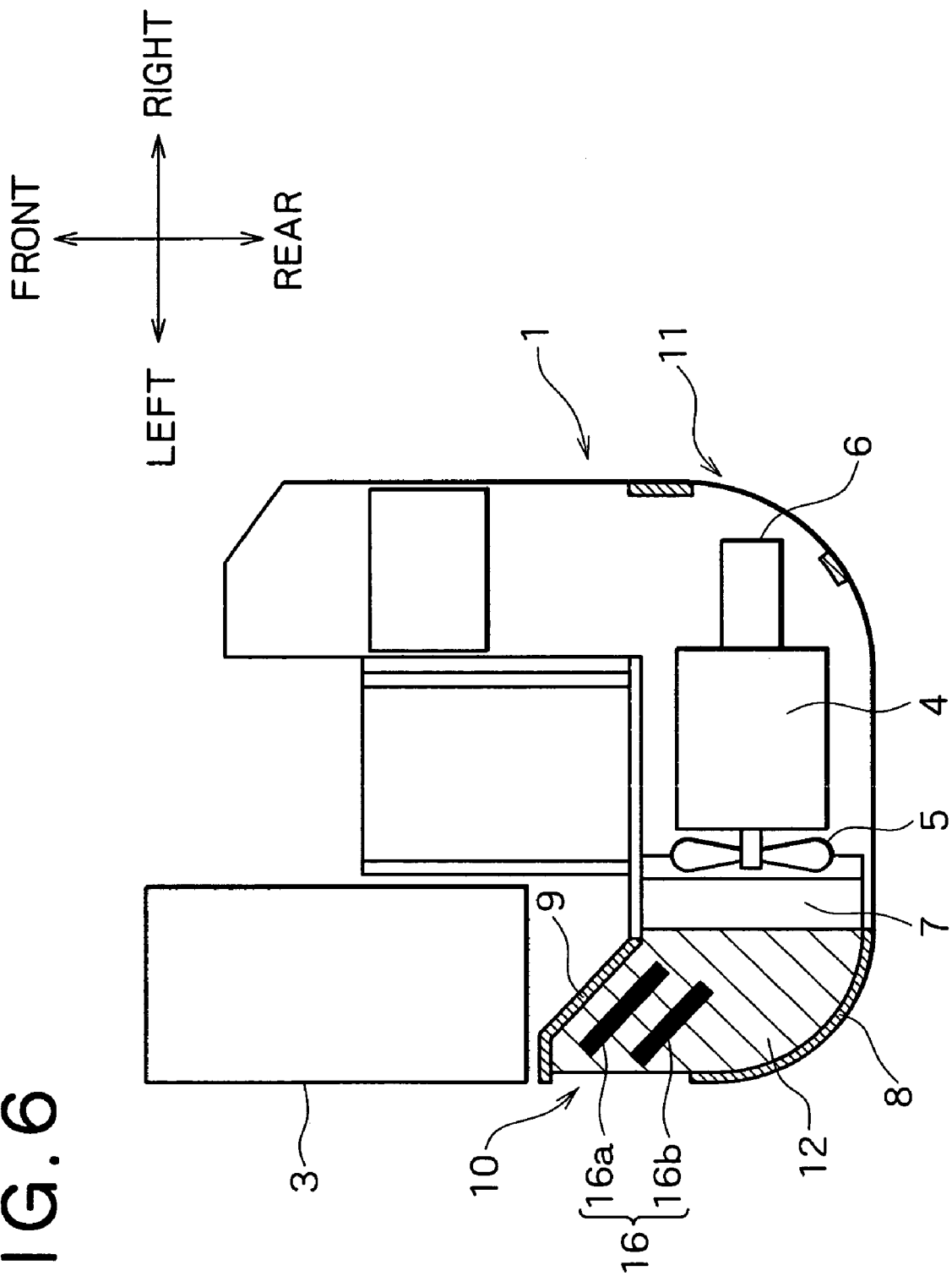
FIG. 6 is a view corresponding to FIG. 1, showing a second embodiment of the present invention.

FIG. 6 illustrates a low noise structure according to a second embodiment of the present invention. In the embodiments which follow, components common to those described in the previous first embodiment will be identified by the same reference numerals as in the first embodiment and explanations thereof will be omitted.

In a soundproofing structure shown in FIG. 6, a splitter type sound deadening device 16 is disposed within the duct 12 at a position close to the air-intake opening portion 10. The sound deadening device 16 has heretofore been known as a kind of a sound deadening device. In this embodiment, the sound deadening device 16 includes partitioning plates 16a and 16b for partitioning the interior of the duct 12. The partitioning plates 16a and 16b are disposed in a direction parallel to the engine guard 9 (in an inclined direction relative to the vehicular longitudinal direction). A sound absorbing material is affixed to the inside of each of the partitioning plates 16a and 16b to absorb and deaden the sound energy of acoustic wave traveling through the duct 12.

By thus disposing the splitter type sound deadening device 16 within the duct 12 it is possible to increase the sound absorbing area and hence possible to enhance the sound deadening efficiency of the duct 12. In this embodiment, moreover, since the splitter type sound deadening device 16 is disposed only in the vicinity of the air-intake opening portion 10 and not disposed near the radiator 7, there accrues an advantage that the maintenance of the radiator 7 is easy and there is no fear of increasing the vent resistance.

In case of using a sound deadening device in the present invention, a suitable sound deadening device may be selected irrespective of a concrete type thereof and insofar as the vent resistance is not increased. For example, there may be used a cell type sound deadening device whose section is partitioned into smaller cells than in the splitter type and the cells are each lined with a sound absorbing material.

Figure 7:
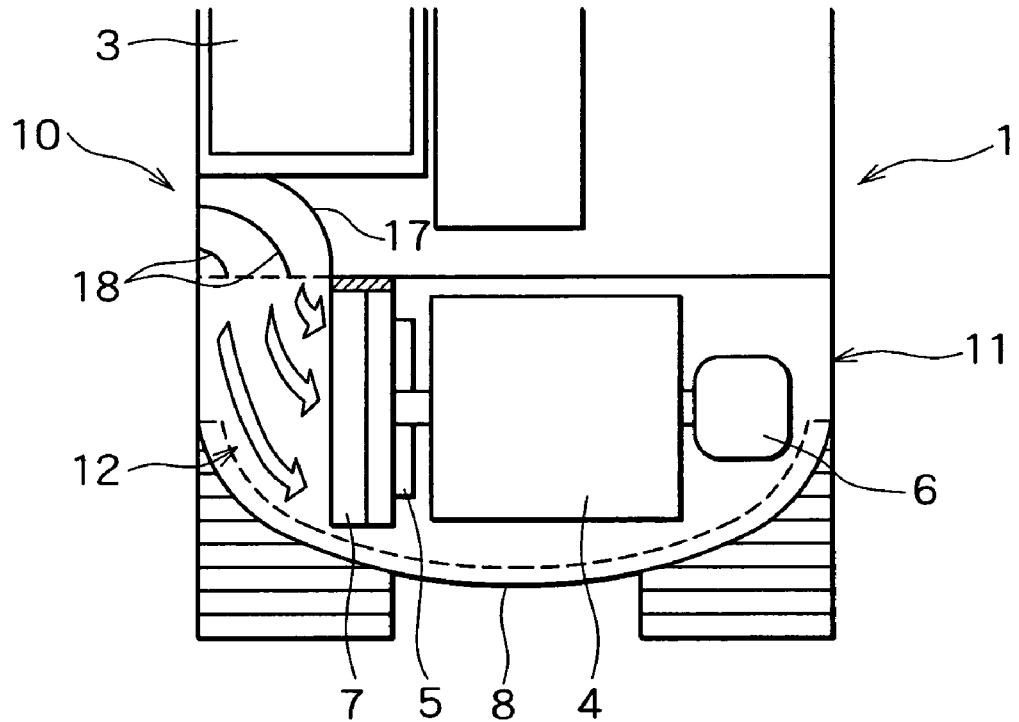
FIG. 7 is a view corresponding to FIG. 1, showing a third embodiment of the present invention.

FIG. 7 illustrates a low noise structure according to a third embodiment of the present invention.

In the low noise structure shown in FIG. 7, as in the above embodiments, the air-intake opening portion 10 is formed in a side face of the machine body and at a position offset obliquely forward from the radiator 7.

The air-intake opening portion 10 and the radiator 7 are connected together by the duct 12 and a part of an engine guard 17 which constitutes a front face of the duct 12 is formed in an arcuate shape.

Plural air guide plates 18 are disposed along the arcuate shape of the engine guard 17.

With the air guide plates 18 thus disposed near the air-intake opening portion 10 in the duct 12, cooling air can be introduced extremely smoothly into the machine body and the cooling air thus introduced can be introduced into the radiator 7 while its flow is kept uniform by the air guide plates 18. Consequently, even without an intake side opening in the front face of the radiator 7, cooling air can be introduced smoothly into the radiator 7 while preventing an increase of the vent resistance in the duct 12.

Figure 8:
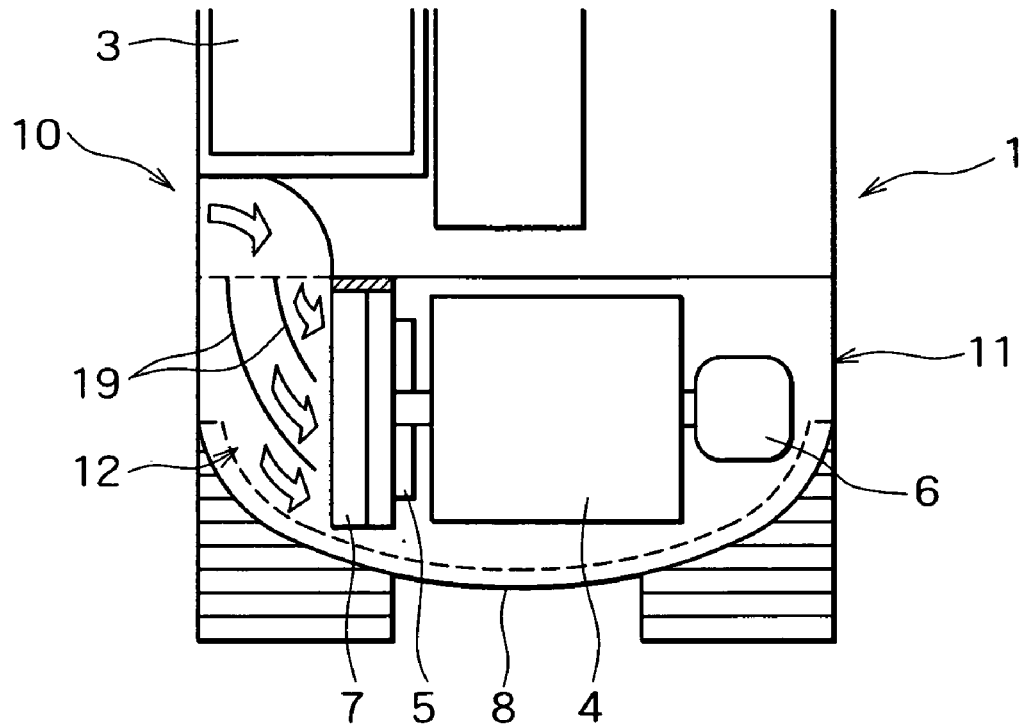
FIG. 8 is a view corresponding to FIG. 1, showing a fourth embodiment of the present invention.

FIG. 8 illustrates a low noise structure according to a fourth embodiment of the present invention.

In the low noise structure shown in FIG. 8, plural air guide plates 19 are disposed within the duct 12 so as to be positioned upstream of and near the radiator 7.

The air guide plates 19 are each formed in an arcuate shape so that the cooling air taken in from the air-intake opening portion 10 is introduced smoothly into the radiator 7.

Figure 9:
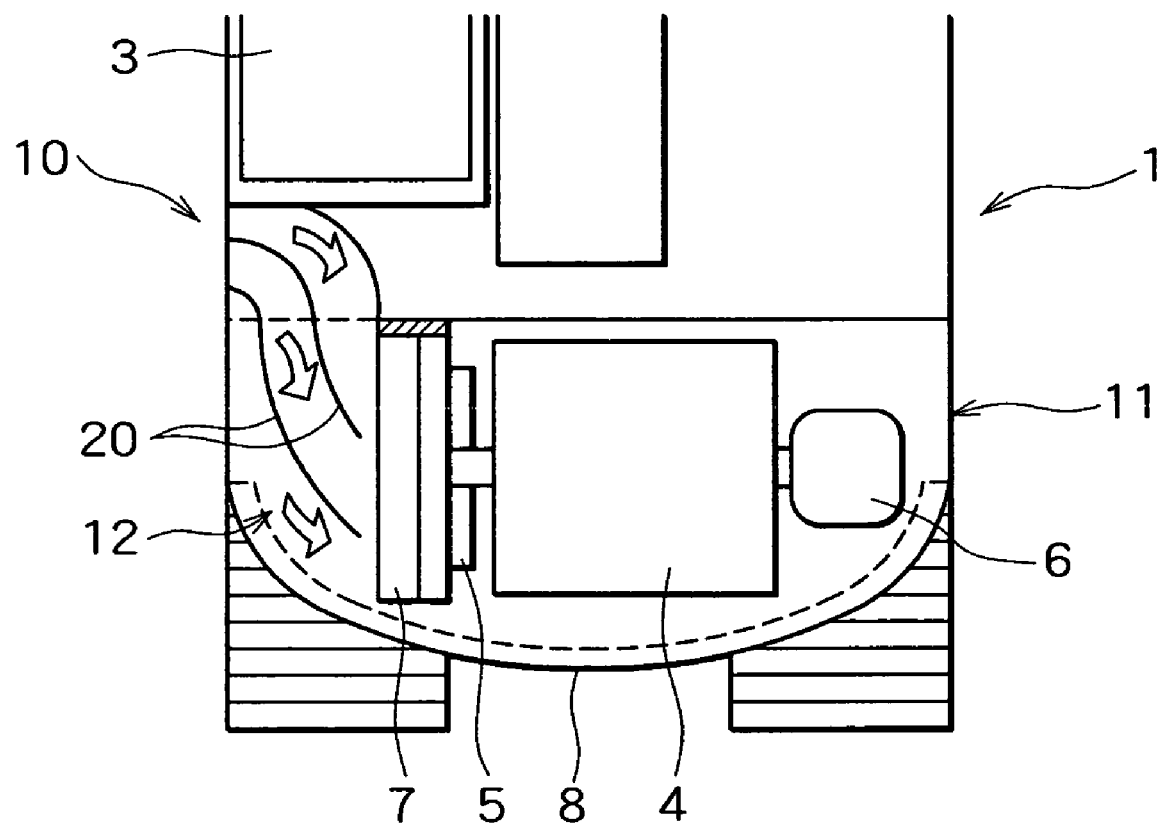
FIG. 9 is a view corresponding to FIG. 1, showing a fifth embodiment of the present invention.

FIG. 9 illustrates a low noise structure according to a fifth embodiment of the present invention.

In the low noise structure shown in FIG. 9, the air guide plates 18 shown in FIG. 7 and the air guide plates 19 shown in FIG. 8 are connected together into air guide partitioning plates 20 to guide cooling air from the intake side opening 10 of the duct to the radiator 7.

By providing the air guide plates 18 or 19 or the air guide partitioning plates 20 in the duct 12, as described above, cooling air can be introduced efficiently into the radiator 7 even if the air-intake opening portion 10 and the radiator 7 are not opposed to each other.

If a sound absorbing material is affixed to the surfaces of the air guide plates 18, 19 and the air guide partitioning plates 20 and also to the inner wall of the duct 12, it is possible to attain a further reduction of noise.

Although in the above embodiments the air-intake opening portion 10 and the radiator 7 are connected together by the duct 12, if partitions are provided at least in front and in the rear by the body cover 8 and the engine guard 9 both shown in FIG. 1, they function as the guide means defined in the present invention and it is possible to obtain a low noise effect.

Figure 10:
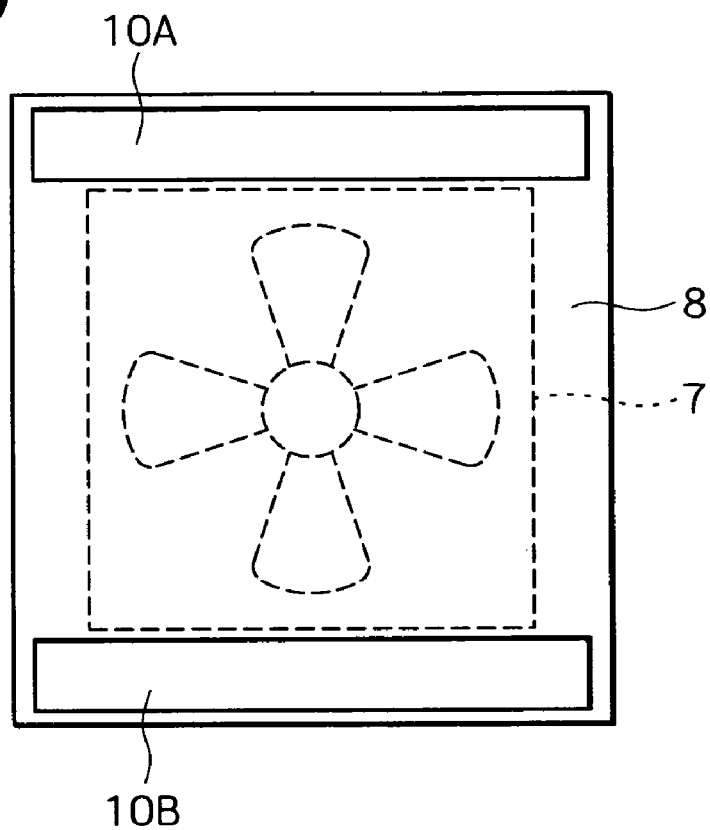
FIG. 10 is a front view showing a sixth embodiment of the present invention.

A construction machine according to a sixth embodiment of the present invention is shown in FIG. 10. The construction machines of the above embodiments are each provided with a single air-intake opening portion 10, but in the construction machine of this sixth embodiment two air-intake opening portions 10A and 10B are formed at positions offset to upper and lower sides with respect to the vent surface of the radiator 7.

According to this structure, by dividing the air-intake opening portion up and down, the opening area of the air-intake opening portion 10A and that of the air-intake opening portion 10B can be kept small while ensuring the total opening area. Therefore, the amount of protrusion of each of the air-intake opening portions 10A and 10B from the vent surface of the radiator 7 can also be kept small. As a result, without a great increase in height of the body cover 8, the air-intake opening portions 10A and 10B can be offset to reduce engine noise.

For example, when a single air-intake opening portion is offset to the upper side with respect to the vent surface of the radiator 7, an upper surface height of the body cover 8 must be so much increased. However, if the air-intake opening portion is divided into upper and lower opening portions 10A, 10B which are offset up and down as shown in the figure, the amount of protrusion of the air-intake opening portion 10A and that of the air-intake opening portion 10B are dispersed up and down, whereby an offset layout of the air-intake opening portions 10A and 10B can be effected with little change of a height position of the radiator 7 and that of the upper surface of the body cover 8. As a result, engine noise can be reduced while preventing an increase in height of the upper surface of the body cover 8.

Figure 11:
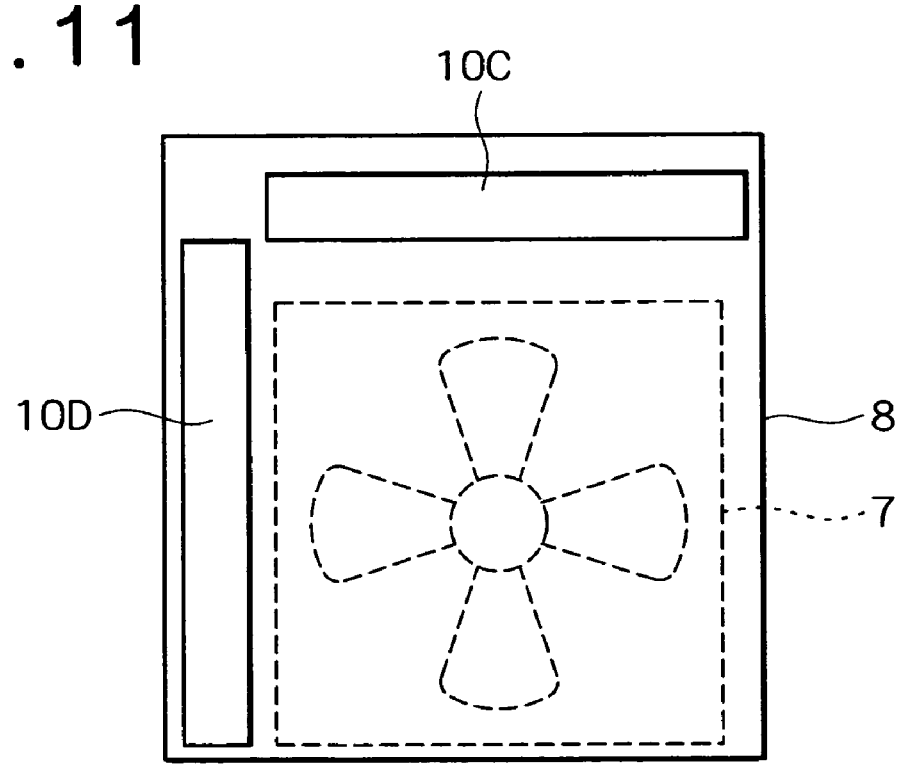
FIG. 11 is a front view showing a seventh embodiment of the present invention.

Further, as in FIG. 11 which illustrates a seventh embodiment of the present invention, if two air-intake opening portions 10C and 10D are offset respectively vertically (to the upper side in the figure) and laterally (to the left side in the figure; the front side of the upper rotating body 1) with respect to the vent surface of the radiator 7, it is possible to ensure a required opening area and a required offset quantity while keeping small the amount of offset in each direction. That is, a layout of air-intake opening portions well-balanced in plural directions can be attained.

If two air-intake opening portions are offset to the front and rear sides, respectively, of the upper rotating body 1, the upper surface height of the boy cover 8 can be kept still lower.

In case of plural air-intake opening portions being formed in the present invention, all of the air-intake opening portions need not be offset 100% with respect to the vent surface of the radiator 7. For example, the air-intake opening portions may include a non-offset opening portion other than the offset opening portion or a partial offset opening portion wherein a part of the opening region is offset disposed to such an extent as overlaps with the vent surface of the heat exchanger.

In this case, there may be adopted a configuration wherein on the inner side of at least a part of the air-intake opening portions of the non-offset opening portion and the partial offset opening portion there is interposed a shield material for shielding between the air-intake opening portion concerned and the vent surface of the heat exchanger. According to this configuration it is possible to obtain an engine noise reducing effect also with respect to the non-offset opening portion or the partial offset opening portion.

An eighth embodiment of the present invention is illustrated in FIGS. 12A and 12B. In these figures, laterally long air-intake opening portions 10E and 10F are disposed in two stages in the upper portion of the body cover 8. The upper air-intake opening portion 10E is offset completely (i.e., to the extent of including no portion overlapping the upper vent surface of the radiator 7) to the upper side from the vent surface. Conversely, the lower air-intake opening portion 10F is superimposed nearly completely on the upper portion of the vent surface of the radiator 7, with the amount of offset being nearly zero. Further, a shield plate 22 is disposed so as to shield between the air-intake opening portion 10F and the vent surface of the radiator 7.

In the illustrated example, the shield plate 22 includes a support portion 22a extending from an upper edge of the air-intake opening portion 10F toward the radiator 7 side and a shield portion 22b extending obliquely downward toward the radiator 7 from an inner end of the support portion 22a, the shield portion 22b being interposed between the air-intake opening portion 10F and the radiator 7. A sound absorbing material 15 is affixed to at least one side (an outer side face located on the air-intake opening portion 10F side in the illustrated example) of the shield portion 22b and also to the back side of a top wall of the cover 8. On the other hand, the exhaust opening portion 11 is formed in a top plate of the body cover 8.

In this structure, air sucked into the body cover 8 from the air-intake opening portion 10E passes as it is above the upper portion of the engine 4 or passes through the vent surface of the radiator 7 and is discharged from the exhaust opening portion 11. On the other hand, air sucked in from the air-intake opening portion 10F is guided downward by the shield plate 22, and then passes through the vent surface of the radiator 7, further through the engine 4, and is discharged from the exhaust opening portion 11.

At this time, the air-intake opening portion 10E is completely offset from the vent surface of the radiator, while the air-intake opening portion 10F is little offset from the vent surface. However, since the shield portion 22b of the shield plate 22 is interposed between the air-intake opening portion 10F and the radiator 7, the leakage of engine noise through the air-intake opening portions 10E and 10F can be suppressed effectively. Particularly, since the sound absorbing material 15 is affixed to the shield plate 22, the engine noise reducing effect becomes more outstanding.

Besides, since only the air-intake opening portion 10E out of both air-intake opening portions 10E and 10F is offset to the upper side, it is possible to prevent an increase in height of the body cover 8 as compared with the case where a single air-intake opening portion is completely offset from the vent surface of the radiator.

Figure 13B:
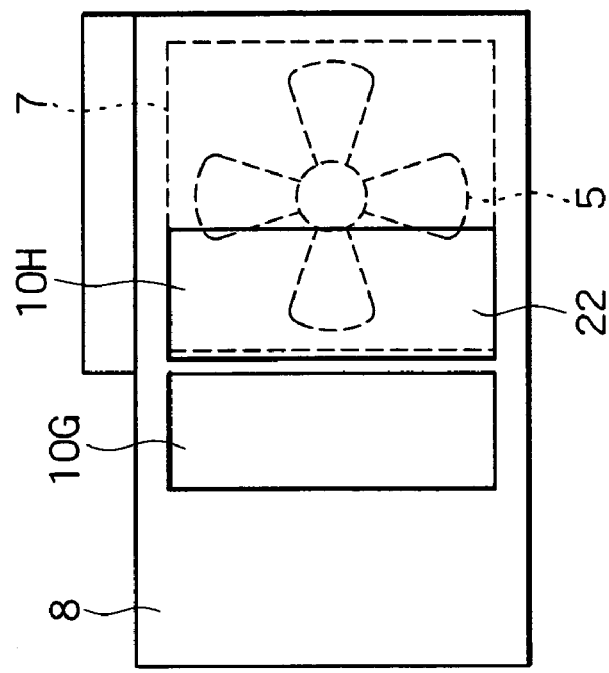
FIG. 13A is a front view showing a ninth embodiment of the present invention and FIG. 13B is a sectional side view thereof
Figure 13A:
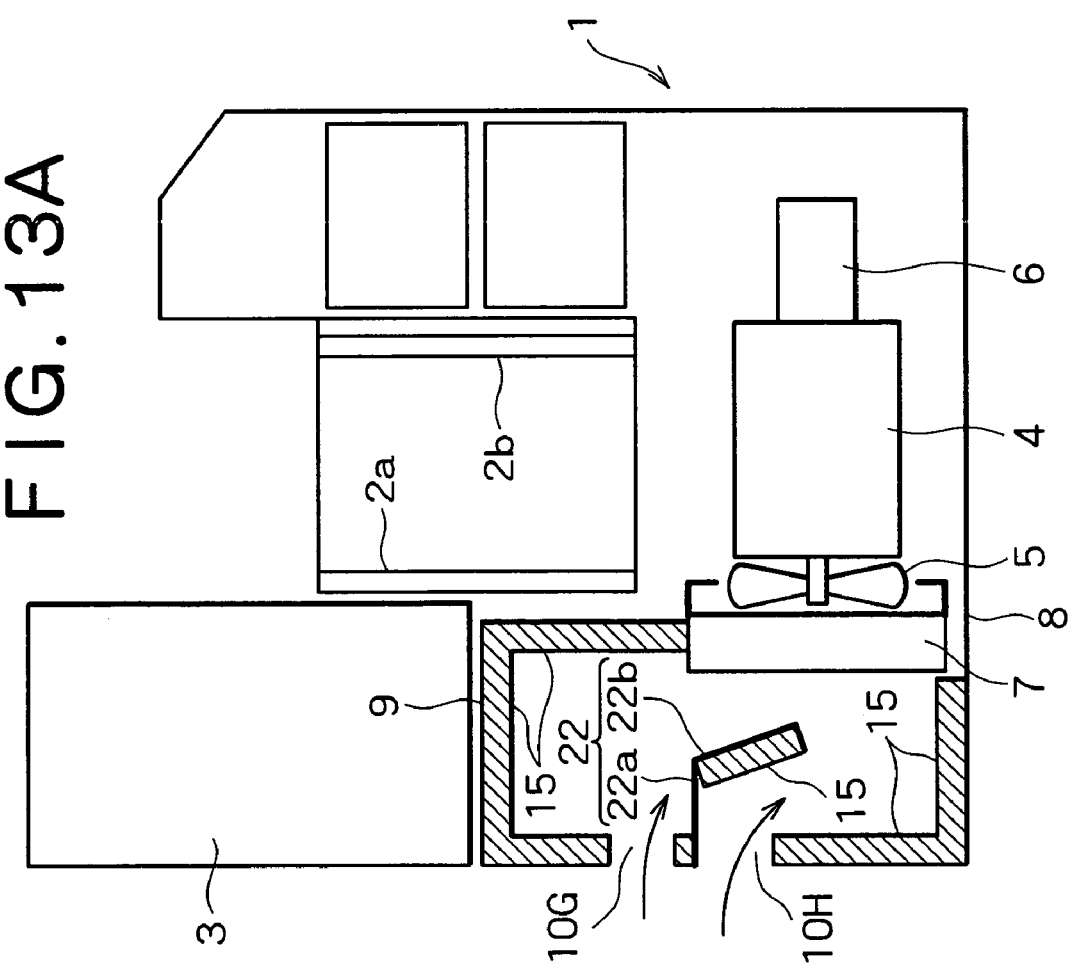

Further, if the offset direction of the air-intake opening portion is set to a lateral direction, it becomes possible to still lower the upper surface height of the body cover 8. This is shown as a ninth embodiment in FIGS. 13A and 13B.

In these figures, vertically long air-intake opening portions 10G and 10H are disposed in two right and left rows in the body cover 8 on a side portion of the vehicle body. The air-intake opening portion 10G located on the left side (the front side of the upper rotating body 1) is offset completely (i.e., to the extent of including no portion overlapping with the vent surface) to the left side from the vent surface of the radiator 7. Conversely, the air-intake opening portion 10H located on the right side (the rear side of the upper rotating body 1) overlaps with the left side portion of the vent surface of the radiator 7 almost completely, with the amount of offset being nearly zero. Further, a shield plate 22 is disposed so as to shut off between the air-intake opening portion 10H and the vent surface of the radiator 7.

The shield plate 22 includes a support portion 22a extending from the left edge of the air-intake opening portion 10H toward the radiator 7 and a shield portion 22b extending from an inner end of the support portion 22a obliquely rightward toward the radiator 7a and the shield portion 22b is interposed between the air-intake opening portion 10H and the radiator 7. The sound absorbing material 15 is affixed to at least one side face (an outer side face located on the air-intake opening portion 10H in the illustrated example) of the shield portion 22b and also to rear side faces of the engine guard 9. On the other hand, the exhaust opening portion 11 is formed in the top plate of the body cover 8.

In this structure, air sucked into the body cover 8 from the air-intake opening portions 10G and 10H passes through the vent surface of the radiator 7 and the engine 4 and is discharged from the exhaust opening portion (not shown). In this case, the air-intake opening portion 10G is completely offset from the radiator vent surface, while the air-intake opening portion 10H is little offset from the radiator vent surface. However, since the shield portion 22b of the shield plate 22 is interposed between the air-intake opening portion 10H and the radiator 7, the leakage of engine noise to the exterior of the cover through the air-intake opening portions 10G and 10H is suppressed effectively. Particularly, since the sound absorbing material 15 is affixed to the shield plate 22, the engine noise reducing effect becomes more outstanding.

The air-intake opening portion in which the shield plate 22 is disposed is not always limited to a completely (100% or more) offset one relative to the vent surface of the radiator. For example, also in the case of an air-intake opening portion which is offset relative to the radiator vent surface to such an extent as partially overlaps the radiator vent surface, it is possible to obtain an excellent engine noise reducing effect by interposing a shield member such as the shield plate 22 between the radiator vent surface and the air-intake opening portion in that overlapping area.

In the present invention, a concrete number of the air-intake opening portion(s) is not limited. For example, four air-intake opening portions may be offset up, down and right, left with respect to the radiator vent surface.

Although in the above embodiments the hydraulic excavator has been described as an example of a construction machine, the present invention is not limited thereto, but is applicable also to other construction machines, including a crane.

INDUSTRIAL APPLICABILITY

As described above, the present invention when applied to a construction machine such as a hydraulic excavator or a crane exhibits a technical effect such that engine noise can be reduced effectively without causing deterioration of the cooling performance for an engine, etc. of the construction machine and while keeping low the height of a body cover.

The invention claimed is:

1. A construction machine comprising:
   a lower traveling body;
   an upper rotating body mounted rotatably on said lower traveling body; and
   an engine room disposed in said upper rotating body and covered with a body cover, with cooling air being introduced from an air-intake opening portion formed in the body cover by operation of a cooling fan disposed within said engine room to cool a heat exchanger accommodated within said body cover and exhaust air after heat exchange being discharged from an exhaust opening portion formed in said body cover, wherein said air-intake opening portion is an offset opening portion, said offset opening portion being formed in a surface of said body cover which is substantially parallel to a vent surface of said heat exchanger, and offset disposed in a lateral direction relative to the vent surface of said heat exchanger so as to protrude at least partially from said vent surface when the inside of the body cover is seen through the air-intake opening portion in a direction orthogonal to the surface of the body cover with the air-intake opening portion formed therein.

2. A construction machine according to claim 1, wherein said engine and said heat exchanger are disposed in the transverse direction of the construction machine in the rear portion of said upper rotating body and said air-intake opening portion is offset disposed on the front side of said upper rotating body relative to the vent surface of said heat exchanger.

3. A construction machine according to claim 2, wherein said heat exchanger is disposed in proximity to the body cover which covers a rear end portion of said upper rotating body, and said body cover constitutes a guide surface for guiding cooling air introduced from said air-intake opening portion to said heat exchanger.

4. A construction machine according to claim 2, wherein a cabin is provided in said upper rotating body at a position ahead of said engine and said heat exchanger, said air-intake opening portion is formed at a position between said cabin and the vent surface of said heat exchanger, and an engine guard is provided between said air-intake opening portion and said cabin, said engine guard constituting a guide surface for guiding cooling air introduced from said air-intake opening portion to said heat exchanger.

5. A construction machine according to claim 1, wherein said offset opening portion includes one which is offset disposed relative to the vent surface of said heat exchanger to the extent that, when said vent surface is seen through said offset opening portion in a direction orthogonal to the vent surface, the ratio of the vent surface capable of being seen is 50% or less of the whole opening area of the offset opening portion.

6. A construction machine according to claim 5, wherein all the air-intake opening portions are offset disposed to the extent that, when said vent surface is seen through the offset opening portions in a direction orthogonal to the vent surface, the ratio of the vent surface capable of being seen is 50% or less of the whole opening area of the offset opening portion.

7. A construction machine according to claim 1, further comprising guide means for guiding cooling air introduced from said air-intake opening portion to said heat exchanger.

8. A construction machine according to claim 7, wherein a duct which provides a connection between said vent surface and said air-intake opening portion is provided as said guide means.

9. A construction machine according to claim 8, further comprising a splitter or cell type sound deadening device incorporated within said duct.

10. A construction machine according to claim 8, further comprising an air guide plate within said duct for guiding cooling air introduced from said air-intake opening portion to said heat exchanger side.

11. A construction machine according to claim 10, further comprising a sound absorbing material affixed to said air guide plate.

12. A construction machine according to claim 7, further comprising a sound absorbing material affixed to said guide means.

13. A construction machine comprising: a lower traveling body; an upper rotating body mounted rotatably on said lower traveling body; and an engine room disposed in said upper rotating body and covered with a body cover, with cooling air being introduced from air-intake opening portions formed in said body cover by operation of a cooling fan disposed within said engine room to cool a heat exchanger accommodated within said body cover and exhaust air after heat exchange being discharged from an exhaust opening portion formed in said body cover, wherein said air-intake opening portions are provided dispersedly in plural positions and include an offset opening portion, said offset opening portion being formed in a surface of said body cover which is substantially parallel to a vent surface of said heat exchanger, and offset disposed relative to the vent surface of said heat exchanger so as to protrude at least partially from the vent surface of said heat exchanger when the inside of the body cover is seen through said offset opening portion in a direction orthogonal to the surface of the body cover with the offset opening portion formed therein.

14. A construction machine according to claim 13, wherein said air-intake opening portions are said offset opening portions, said offset opening portions being offset disposed in mutually different directions relative to the vent surface of said heat exchanger.

15. A construction machine according to claim 14, wherein said offset opening portions include an offset opening portion which is offset disposed vertically relative to the vent surface of said heat exchanger and an offset opening portion which is offset disposed laterally relative to said vent surface.

16. A construction machine according to claim 14, wherein all the air-intake opening portions are said offset opening portions.

17. A construction machine according to claim 13, wherein said air-intake opening portions include a non-offset opening portion other than said offset opening portion or a partial offset opening portion wherein a part of its opening region is offset disposed to such an extent as overlaps with the vent surface of said heat exchanger, and on the inner side of at least a part of the air-intake opening portions out of said non-offset opening portion and said partial offset opening portion there is interposed a shield material for shielding between the air-intake opening portion concerned and the vent surface of said heat exchanger.

18. A construction machine according to claim 17, wherein a sound absorbing material is provided on at least one side of said shield material.

* * * * *